(12) United States Patent
Xing et al.

(10) Patent No.: US 12,524,659 B2
(45) Date of Patent: Jan. 13, 2026

(54) NEURON DEVICE BASED ON SPIN ORBIT TORQUE

(71) Applicant: INSTITUTE OF MICROELECTRONICS, CHINESE ACADEMY OF SCIENCES, Beijing (CN)

(72) Inventors: Guozhong Xing, Beijing (CN); Di Wang, Beijing (CN); Huai Lin, Beijing (CN); Long Liu, Beijing (CN); Ming Liu, Beijing (CN)

(73) Assignee: INSTITUTE OF MICROELECTRONICS, CHINESE ACADEMY OF SCIENCES, Beijing (CN)

( * ) Notice: Subject to any disclaimer, the term of this patent is extended or adjusted under 35 U.S.C. 154(b) by 463 days.

(21) Appl. No.: 18/034,365

(22) PCT Filed: Jul. 21, 2021

(86) PCT No.: PCT/CN2021/107631
§ 371 (c)(1),
(2) Date: Apr. 27, 2023

(87) PCT Pub. No.: WO2022/083193
PCT Pub. Date: Apr. 28, 2022

(65) Prior Publication Data
US 2023/0394291 A1    Dec. 7, 2023

(51) Int. Cl.
*H10N 52/00* (2023.01)
*G06N 3/063* (2023.01)
(Continued)

(52) U.S. Cl.
CPC ......... *G06N 3/063* (2013.01); *H01F 10/3286* (2013.01); *H10N 50/85* (2023.02); *H10N 52/00* (2023.02); *G11C 11/161* (2013.01)

(58) Field of Classification Search
CPC . G06N 3/063; G06N 3/04; G06N 3/08; H01F 10/3286; H01F 10/123;
(Continued)

(56) References Cited

U.S. PATENT DOCUMENTS 6,118,624 A * 9/2000 Fukuzawa ............ G11B 5/3903
7,098,495 B2    8/2006 Sun et al.
(Continued)

FOREIGN PATENT DOCUMENTS

CN    1985377        6/2007
CN    105938872 A  * 9/2016 .............. H10N 50/01
(Continued)

OTHER PUBLICATIONS

Office Action issued in corresponding Chinese Patent Application No. 202110840235.1, dated Jun. 26, 2024.
(Continued)

*Primary Examiner* — Evren Seven
(74) *Attorney, Agent, or Firm* — Pillsbury Winthrop Shaw Pittman, LLP

(57) ABSTRACT

A neuron device including: an antiferromagnetic pinning layer, a first ferromagnetic layer and a spin orbit coupling layer formed on a substrate in sequence; a free layer formed on the spin orbit coupling layer and moving a magnetic domain wall according to a spin orbit torque; a tunneling layer formed on the free layer; a left pinning layer and a right pinning layer formed on two sides of the free layer and having opposite magnetization directions; and a reference layer formed on the tunneling layer; wherein the free layer, the tunneling layer and the reference layer constitute a magnetic tunnel junction, and the magnetic tunnel junction is configured to read neuronal signals. Also provided is a method for preparing a neuron device based on a spin orbit torque.

10 Claims, 8 Drawing Sheets

(51) Int. Cl.
  *G11C 11/16* (2006.01)
  *H01F 10/32* (2006.01)
  *H10N 50/85* (2023.01)

(58) Field of Classification Search
  CPC ... H01F 10/3268; H01F 10/329; H10N 50/85; H10N 50/10; H10N 52/00; G11C 11/161
  See application file for complete search history.

(56) References Cited

U.S. PATENT DOCUMENTS

| | | | | |
|---|---|---|---|---|
| 9,460,397 | B2 * | 10/2016 | Apalkov | H01F 41/302 |
| 12,274,178 | B2 * | 4/2025 | Hong | H10N 50/80 |
| 2006/0017081 | A1 | 1/2006 | Sun et al. | |
| 2012/0217993 | A1 * | 8/2012 | Nikonov | G01R 33/093 |
| | | | | 326/35 |
| 2012/0242416 | A1 * | 9/2012 | Katti | H01F 10/3218 |
| | | | | 427/128 |
| 2017/0249550 | A1 | 8/2017 | Sengupta et al. | |
| 2017/0330070 | A1 | 11/2017 | Sengupta et al. | |
| 2023/0100649 | A1 * | 3/2023 | Li | H10N 50/85 |
| | | | | 257/421 |

FOREIGN PATENT DOCUMENTS

| | | | |
|---|---|---|---|
| CN | 110335940 | 10/2019 | |
| CN | 112599161 | 4/2021 | |
| CN | 112652706 | 4/2021 | |
| CN | 112802515 | 5/2021 | |
| WO | WO-2021182778 A1 * | 9/2021 | G11C 11/1675 |

OTHER PUBLICATIONS

International Search Report and Written Opinion issued in corresponding International Application No. PCT/CN2021/107631, dated Mar. 2, 2022.

* cited by examiner

NEURON DEVICE BASED ON SPIN ORBIT TORQUE

This application is the U.S. national phase entry of PCT Patent Application No. PCT/CN2021/107631 filed on Jul. 21, 2021, which is incorporated herein in its entirety by reference.

TECHNICAL FIELD

The present disclosure relates to a field of brain-like computing technology, and in particular, to a neuron device based on a spin orbit torque.

BACKGROUND

A brain-inspired neuromorphic computing is one of the potential development directions in the "post-Moore" era to solve the memory problems in the von Neumann architecture and deal with the end of the Moore's Law. The neuromorphic computing is expected to significantly reduce the power consumption of a chip while further improving the computing power of a chip.

In the process of developing a neuromorphic computing, it is first necessary to study neuromorphic devices (synapses, neurons, etc.) with certain biological properties. In recent years, researchers have discovered that memories of new types (magnetic memories, resistive memories, phase change memories, ferroelectric memories, etc.) and some new principle devices (ion transistors, etc.) may better and more abundantly simulate some properties of human brain synapses and neurons compared with traditional CMOS neuron circuits with high power consumption and large area overhead. Among them, magnetic memories are very competitive in the field of neuromorphic computing due to the high speed, high endurance, and low power consumption thereof.

However, the current research on neuromorphic devices based on spintronic devices mostly stays on the research on synaptic devices, and the research on neuron devices is relatively rare. Moreover, the only remaining neuron devices all simulate the integrate characteristics of the neurons based on a manner of a magnetic domain wall motion driven by the spin transfer torque, but the velocity of the magnetic domain wall motion driven by the spin transfer torque is slower compared with the driving manner of the spin orbit torque. The leaky characteristics of neurons are achieved by means of shape anisotropy, bias field, and anisotropic gradient.

Therefore, in order to be applicable for high-speed and complex neural networks, it is necessary to explore neuron devices of a magnetic domain wall motion driven by a spin orbit torque and simulate the leaky characteristics of neurons through more mechanisms.

SUMMARY

In order to solve the above problems in the related art, according to the present disclosure, there is provided a neuron device based on a spin orbit torque, so as to simulate characteristics of integration, leakage and firing of a biological neuron based on a magnetic tunnel junction, and to achieve pinning of a domain wall by depositing antiferromagnets having opposite local magnetization directions on two sides of a free layer or thicker local free layers.

According to a first aspect of the present application, there is provided a neuron device based on a spin orbit torque, including: an antiferromagnetic pinning layer, a first ferromagnetic layer and a spin orbit coupling layer formed on a substrate in sequence, wherein the spin orbit coupling layer is composed of one or more materials of Ta, W, and Mo; a free layer formed on the spin orbit coupling layer and moving a magnetic domain wall according to a spin orbit torque; a tunneling layer formed on the free layer; a left pinning layer and a right pinning layer formed on two sides of the free layer and having opposite magnetization directions; and a reference layer formed on the tunneling layer; wherein the free layer, the tunneling layer and the reference layer constitute a magnetic tunnel junction, and the magnetic tunnel junction is configured to read neuronal signals.

Further, the spin orbit coupling layer is composed of one or more materials of Ta, W, and Mo.

Further, the free layer has a perpendicular magnetic anisotropy and is composed of one or more materials selected from CoFeB, Co/Pt, CoFeAl, Co/Pd and CoFe; the first ferromagnetic layer has an in-plane magnetic anisotropy, and is composed of one or more materials selected from CoFeB, NiFe and Co; and the antiferromagnetic pinning layer has a perpendicular exchange interaction, and is composed of one or more materials selected from IrMn, FeMn, NiMn, CoMn, PtMn, $Mn_2Au$, NiO and MnO.

Further, the free layer has a perpendicular magnetic anisotropy and is composed of one or more materials selected from CoFeB, Co/Pt, CoFeAl, Co/Pd and CoFe; the first ferromagnetic layer has an inclined magnetic anisotropy, and is composed of one or more materials selected from CoFeB, NiFe, Co, CoFeAl, and CoFe; and the antiferromagnetic pinning layer has a tilt exchange interaction, and is composed of one or more materials selected from IrMn, FeMn, NiMn, CoMn, PtMn, $Mn_2Au$, NiO and MnO.

Further, the free layer has an inclined magnetic anisotropy and is composed of one or more materials selected from CoFeB, NiFe, Co, CoFeAl and CoFe; the first ferromagnetic layer has a perpendicular magnetic anisotropy and is composed of one or more materials selected from CoFeB, Co/Pt, CoFeAl, Co/Pd and CoFe; and the antiferromagnetic pinning layer has a perpendicular exchange interaction, and is composed of one or more materials selected from IrMn, FeMn, NiMn, CoMn, PtMn, $Mn_2Au$, NiO and MnO.

Further, the device further includes a second ferromagnetic layer formed between the antiferromagnetic pinning layer and the first ferromagnetic layer.

Further, the free layer has a perpendicular magnetic anisotropy and is composed of one or more materials selected from CoFeB, Co/Pt, CoFeAl, Co/Pd and CoFe; the first ferromagnetic layer has an in-plane magnetic anisotropy, and is composed of one or more materials selected from CoFeB, NiFe and Co; the antiferromagnetic pinning layer has a perpendicular exchange interaction, and is composed of one or more materials selected from IrMn, FeMn, NiMn, CoMn, PtMn, $Mn_2Au$, NiO and MnO; and the second ferromagnetic layer has a perpendicular magnetic anisotropy, and is composed of one or more materials selected from CoFeB, Co/Pt, CoFeAl, Co/Pd and CoFe.

Further, the device further includes a second ferromagnetic layer and an insulating layer formed on the substrate in sequence, wherein the antiferromagnetic pinning layer is located on the insulating layer.

Further, the free layer has a perpendicular magnetic anisotropy and is composed of one or more materials selected from CoFeB, Co/Pt, CoFeAl, Co/Pd and CoFe; the first ferromagnetic layer has a perpendicular magnetic anisotropy and is composed of one or more materials selected from CoFeB, Co/Pt, CoFeAl, Co/Pd and CoFe; the antiferromagnetic pinning layer has a perpendicular exchange interaction, and is composed of one or more materials selected from IrMn, FeMn, NiMn, CoMn, PtMn, Mn$_2$Au, NiO and MnO; the insulating layer is composed of SiO$_2$; and the second ferromagnetic layer has an in-plane magnetic anisotropy, and is composed of one or more materials selected from CoFeB, NiFe, and Co.

Further, the device further includes: a second ferromagnetic layer and a spacer layer formed on the antiferromagnetic pinning layer in sequence, wherein the first ferromagnetic layer is located on the spacer layer.

Further, the free layer has a perpendicular magnetic anisotropy, and is composed of one or more materials selected from CoFeB, Co/Pt, CoFeAl, Co/Pd and CoFe; the first ferromagnetic layer has an in-plane magnetic anisotropy, and is composed of one or more materials selected from CoFeB, NiFe and Co; the spacer layer is composed of one or more materials selected from Ru, Ta, W, V, Cr, Rh, Nd, Mo, and Re; the second ferromagnetic layer has a perpendicular magnetic anisotropy, and is composed of one or more materials selected from CoFeB, Co/Pt, CoFeAl, Co/Pd, and CoFe; and the antiferromagnetic pinning layer has a perpendicular exchange interaction, and is composed of one or more materials selected from IrMn, FeMn, NiMn, CoMn, PtMn, Mn$_2$Au, NiO and MnO.

Further, the spin orbit coupling layer is configured to achieve integrate and leaky characteristics of a neuron. A current is passed through the spin orbit coupling layer to generate a spin current in a vertical direction based on the spin Hall effect, and the domain wall is moved under an action of the spin orbit torque, so as to simulate the integrate characteristics of a biological neurons. In an absence of a current, the free layer and the first ferromagnetic layer are ferromagnetically or antiferromagnetically coupled through the spin orbit coupling layer by the RKKY effect, so that the domain wall in the free layer has a movement trend opposite to a current driving direction, thereby achieving the leaky characteristics of the biological neuron. When a movement position of the domain wall in the free layer exceeds a threshold region, the magnetic tunnel junction will switch from an antiparallel state to a parallel state, and an external circuit is used to output a spike pulse, so as to simulate the fire characteristics of the biological neuron.

Further, a layer thickness of the free layer is 0.8 to 2 nm.

Further, the RKKY effect is related to a layer thickness, a material and a modulation injection current density of the spin orbit coupling layer.

Further, the velocity of a neuronal integrate process is modulated by modulating a Dzyaloshinskii-Moriya interaction (DMI) coefficient and a damping coefficient that have appropriate magnitude and different signs.

Further, the device further includes: a left electrode, a right electrode and a top electrode, wherein the left electrode and the right electrode are respectively arranged on two sides of the spin orbit coupling layer where the free layer is not arranged, and the top electrode is located on the reference layer.

Further, a layer thickness of the reference layer is greater than that of the free layer, and is preferably 0.8 to 2 nm.

Further, a layer thickness of the tunneling layer is preferably 0.5 to 4 nm.

Further, layer thicknesses of the left electrode, the right electrode and the top electrode are all 50 to 200 nm.

Further, an inclined magnetization direction or an inclined magnetic anisotropy of the first ferromagnetic layer or the free layer is configured to generate an equivalent field in an x direction on the free layer, so that the chirality of the magnetic domain wall remains unchanged and a high velocity motion of the domain wall is achieved while avoiding uncertainty of a movement direction of a next integrate process caused by a precession induced chirality change of the domain wall during a leaky process.

According to a second aspect of the present disclosure, there is provided a method for manufacturing a neuron device based on a spin orbit torque, including: growing an antiferromagnetic pinning layer, a first ferromagnetic layer, a spin orbit coupling layer, and a free layer on a substrate in sequence, forming a left electrode and a right electrode on two sides of the spin orbit coupling layer respectively; and forming a tunneling layer, a reference layer and a top electrode on the free layer in sequence, wherein the free layer, the tunneling layer and the reference layer constitute a magnetic tunnel junction, and the magnetic tunnel junction is configured to read neuronal signals.

BRIEF DESCRIPTION OF THE DRAWINGS

For a more complete understanding of the present disclosure and its advantages, reference will now be made to the following description in combination with the accompanying drawings.

DETAILED DESCRIPTION OF EMBODIMENTS

Figure 1:
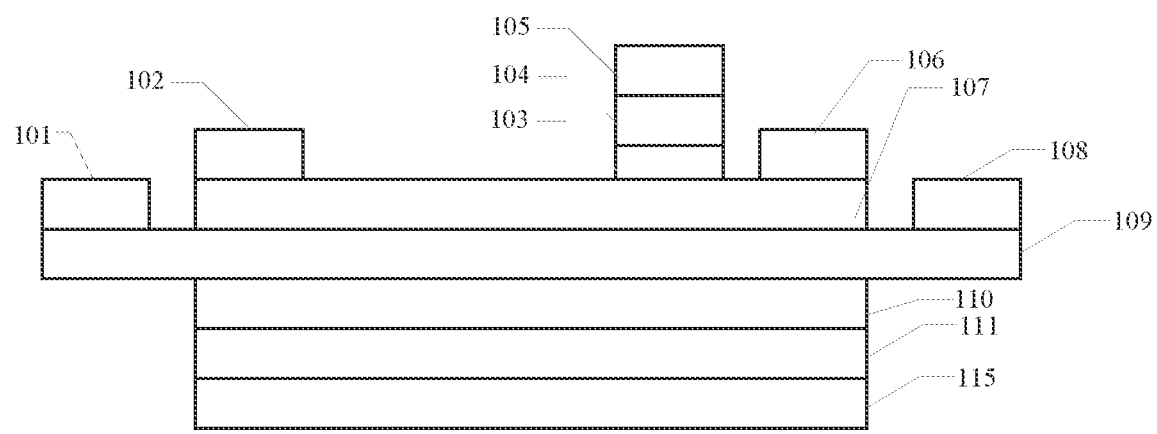
FIG. 1 illustratively shows a front view of a neuron device based on a spin orbit torque according to the first to third embodiments of the present disclosure.

The embodiments of the present disclosure will be described below with reference to the accompanying drawings. However, it should be understood that these descriptions are only exemplary, and are not intended to limit the scope of the present disclosure. In the following detailed description, for convenience of explanation, numerous specific details are set forth in order to provide a thorough understanding of the embodiments of the present disclosure. However, it will be apparent that one or more embodiments may be implemented without these specific details. Additionally, in the following description, descriptions of commonly known structures and technologies are omitted to avoid unnecessarily obscuring the concepts of the present disclosure.

It will be understood that when an element (such as a layer, a film, a region, or a substrate) is referred to as being "on" another element, it may be directly on another element or an intermediate element may also exist. Moreover, in the description and claims, when an element is described as being "connected" to another element, the element may be "directly connected" to another element or "connected" to another element through a third element.

All terms (including technical and scientific terms) used herein have the meanings commonly understood by those skilled in the art, unless otherwise defined. It should be noted that the terms used herein should be construed to have meanings consistent with the context of the present description and should not be construed in an idealized or overly rigid manner.

According to the present disclosure, there is provided a neuron device based on a spin orbit torque, including: an antiferromagnetic pinning layer, a first ferromagnetic layer and a spin orbit coupling layer formed on a substrate in sequence, a free layer formed on the spin orbit coupling layer and moving a magnetic domain wall according to the spin orbit torque; a tunneling layer formed on the free layer; a left pinning layer and a right pinning layer formed on two sides of the free layer and having opposite magnetization directions; and a reference layer formed on the tunneling layer; wherein the free layer, the tunneling layer and the reference layer constitute a magnetic tunnel junction, and the magnetic tunnel junction is configured to read neuronal signals.

With the neuron device based on a spin orbit torque provided according to the present disclosure, the following technical effects are achieved: first, pinning of the domain wall is achieved by depositing antiferromagnets having opposite magnetization directions on two sides of the free layer or retaining/depositing a thicker local free layer. Second, the integrate and leaky characteristics of a neuron are achieved by multiplexing the spin orbit coupling layer. On the one hand, when a current is passed through the spin orbit coupling layer, a spin current in a vertical direction is generated due to the spin Hall effect. Under the action of the spin orbit torque, the domain wall is moved to simulate the integrate characteristics of a neuron. On the other hand, in an absence of a current, the free layer and the second ferromagnetic layer are ferromagnetically or antiferromagnetically coupled by the RKKY action through the spin orbit coupling layer, so that the domain wall in the free layer has a movement trend opposite to the current driving direction, thereby achieving the leaky function. Third, the tilted magnetization direction or tilted magnetic anisotropy of the second ferromagnetic layer or the free layer is achieved by depositing a stray field of an in-plane magnetically anisotropic ferromagnetic layer or by means of exchange bias, interlayer exchange coupling, or annealing in an inclined magnetic field, so that an equivalent field in an x direction is generated on the free layer, which ensures that the chirality of the magnetic domain wall remains unchanged. In this way, a high velocity motion of the domain wall is achieved and the uncertainty of the movement direction of a next integrate process caused by a precession induced chirality change of the domain wall during the leaky process is avoided. At last, according to the amplitude, pulse width and number of current pulses from synapses, the magnetic domain walls is driven to move, thereby achieving the integrate characteristics of a neuron. When there is no current pulse, the domain wall will move in the opposite direction under the RKKY action of the lower ferromagnetic layer to achieve the leaky function of a neuron. When the domain wall moves to a threshold region, i.e., the magnetization direction of the corresponding local free layer below the reference layer is reversed, the MTJ outputs a spike signal in combination with a peripheral circuit to achieve the fire function of a neuron.

The technical solutions of the present disclosure will be described in detail below with reference to the neuron device structures in some specific embodiments of the present disclosure. It should be understood that the material layers, shapes and structures of various portions of the neuron device based on a spin orbit torque shown in FIG. 1 to FIG. 6 are only exemplary, so as to assist those skilled in the art in understanding the technical solutions of the present disclosure, and are not intended to limit the protection scope of the present disclosure.

Embodiment 1

FIG. 1 illustratively shows a front view of a neuron device based on a spin orbit torque according to the first embodiment of the present disclosure. The device is a neuromorphic device in which a magnetic domain wall is moved by a spin orbit torque, so as to simulate the leaky-integrate-fire characteristics of a biological neuron.

As shown in FIG. 1, the neuron device based on a spin orbit torque according to the embodiments of the present disclosure includes: a substrate 115, an antiferromagnetic pinning layer 111, a first ferromagnetic layer 110, a spin orbit coupling layer 109, and a right electrode 108, a free layer 107, a right pinning layer 106, a top electrode 105, a reference layer 104, a tunneling layer 103, a left pinning layer 102 and a left electrode 101.

The substrate 115 may be composed of a sapphire substrate, a silicon substrate, or a quartz substrate having different crystal planes.

The antiferromagnetic pinning layer 111 is formed on an upper surface of the substrate 115.

The first ferromagnetic layer 110 is formed on an upper surface of the antiferromagnetic pinning layer 111.

The spin orbit coupling layer 109 is formed on an upper surface of the first ferromagnetic layer 110, and a transverse length of the spin orbit coupling layer 109 is greater than that of the first ferromagnetic layer 110. In the embodiment of the present disclosure, the left electrode 101 and the right electrode 108 are provided on two sides of an upper surface of the spin orbit coupling layer 109 where the free layer 107 is not provided.

The free layer 107 is formed on an upper surface of the spin orbit coupling layer 109, and a transverse length of the free layer 107 is smaller than that of the spin orbit coupling layer 109. In the embodiment of the present disclosure, the left electrode 101 and the right electrode 108 are provided on two sides of an upper surface of the spin orbit coupling layer 109 where the free layer 107 is not provided.

The tunneling layer 103 is formed on an upper surface of the free layer 107, and a transverse length of the tunneling layer 103 is smaller than that of the free layer 107, wherein a region of the free layer 107 directly facing the tunneling layer 103 forms a threshold region. In the embodiment of the present disclosure, the left pinning layer 102 and the right pinning layer 106 having opposite magnetization directions are provided on two sides of an upper surface of the free layer 107 where the tunneling layer 103 is not provided.

The reference layer 104 is formed on an upper surface of the tunneling layer 103.

The top electrode 105 is formed on an upper surface of the reference layer 104.

Specifically, the free layer 107, the tunneling layer 103 and the reference layer 104 constitute a magnetic tunnel junction (MTJ) for reading. The free layer 107, the spin orbit coupling layer 109 and the first ferromagnetic layer 110 are coupled by an RKKY exchange interaction of the spin orbit coupling layer 109. Specifically, a ferromagnetic coupling or an antiferromagnetic coupling may be achieved according to a change of a layer thickness of the spin orbit coupling layer 109. Generally, the ferromagnetic and antiferromagnetic coupling exhibits an oscillatory change as the layer thickness of the spin orbit coupling layer 109 increases, and the oscillation period is about 1 nm. For example, when the thickness of the spin orbit coupling layer 109 composed of a W material is less than 0.43 nm, the ferromagnetic coupling is achieved. When the thickness of the spin orbit coupling layer 109 composed of the W material is greater than 0.43 nm and less than 0.75 nm, the antiferromagnetic coupling is achieved.

In this embodiment, the antiferromagnetic coupling is taken as an example. The reference layer 104 and the free layer 107 have perpendicular magnetic anisotropy, and are composed of one or more materials selected from CoFeB, Co/Pt, CoFeAl, Co/Pd, and CoFe. A layer thickness of the reference layer 104 is preferably 0.8-2 nm, and a layer thickness of the free layer 107 is preferably 0.8-2 nm. The tunneling layer 103 is composed of MgO, $Al_2O_3$, etc., and a layer thickness thereof is preferably 0.5-4 nm. The first ferromagnetic layer 110 has a relatively thick in-plane magnetic anisotropy, and is composed of one or more materials selected from CoFeB, NiFe, and Co, and it is sufficient that the layer thickness thereof satisfies the in-plane anisotropy. The spin orbit coupling layer 109 is composed of one or more materials of metals such as Ta, W and Mo, and is characterized in enabling the ferromagnetic layers on the two sides to generate the RKKY exchange interaction, and at the same time, having a strong spin orbit coupling effect as well as a significant spin Hall effect. The left pinning layer 102 and the right pinning layer 106 may be made of antiferromagnetic materials such as IrMn and PtMn, or the same material as the free layer 107. The antiferromagnetic pinning layer 111 has an antiferromagnetic exchange interaction in a vertical direction, and is composed of one or more materials selected from IrMn, FeMn, NiMn, CoMn, PtMn, $Mn_2Au$, NiO and MnO. The left electrode 101, the top electrode 105 and the right electrode 108 are made of metals or alloys such as Ti, Au, Ti/Au, Ti/Pt, Cr/Au and Ta/CuN, and the layer thickness of each electrode layer is preferably 50-200 nm.

In this embodiment, the magnetization direction of the reference layer 104 is along a −z direction. The magnetization direction of the left pinning layer 102 is along the −z direction, and the magnetization direction of the right pinning layer 106 is along a +z direction, so that the magnetic domain wall may move within a range between the left and right pinning regions without being annihilated. The magnetization direction of the first ferromagnetic layer 110 is along an x direction, and the bottom antiferromagnetic pinning layer 111 is along the +z direction, so that the magnetization direction of the first ferromagnetic layer 110 may be pinned in the −z and x directions. There is a strong exchange bias field at an interface between the first ferromagnetic layer 100 and the bottom antiferromagnetic pinning layer 111 that exchanges perpendicularly, so that the magnetization direction of the first ferromagnetic layer 110 is inclined (in the x-z plane). Under the RKKY action of a spacer layer, equivalent fields in the +z and x directions may be generated on the free layer 107, so that the chirality of the domain wall in the free layer 107 remains unchanged, and a high velocity motion of the domain wall is achieved while avoiding uncertainty of a movement direction of a next integrate process caused by a precession induced chirality change of the domain wall during a leaky process.

Embodiment 2

The structure of the neuron device based on a spin orbit torque according to this embodiment is shown in FIG. 1. This embodiment differs from Embodiment 1 in the following.

In this embodiment, the antiferromagnetic coupling effect is taken as an example. The first ferromagnetic layer 110 has an inclined magnetic anisotropy (in the x-z plane), and is composed of one or more materials selected from CoFeB, NiFe, Co, CoFeAl, and CoFe. This may be specifically achieved by annealing in an oblique magnetic field, sputtering at an oblique angle, or the like. The antiferromagnetic pinning layer 111 has an inclined antiferromagnetic exchange interaction, and is composed of one or more materials selected from IrMn, FeMn, NiMn, CoMn, PtMn, $Mn_2Au$, NiO and MnO. It should be noted that, in this embodiment, other material layers are the same as those in Embodiment 1, and will not be repeated here.

Specifically, the magnetization direction of the reference layer 104 is along a −z direction. The magnetization direction of the left pinning layer 102 is along the −z direction, and the magnetization direction of the right pinning layer 106 is along a +z direction, so that the magnetic domain wall may move within a range between the left and right pinning regions without being annihilated. The bottom antiferromagnetic pinning layer 111 is along the +z and x directions, so that the magnetization direction of the first ferromagnetic layer 110 may be pinned in the −z and x directions. The magnetization direction of the first ferromagnetic layer 110 having an inclined magnetic anisotropy is inclined (in the x-z plane). Under the RKKY action of a spacer layer, equivalent fields in the +z and x directions may be generated on the free layer 107, so that the chirality of the domain wall in the free layer 107 remains unchanged and a high velocity motion of the domain wall is achieved while avoiding uncertainty of a movement direction of a next integrate process caused by a precession induced chirality change of the domain wall during a leaky process.

Embodiment 3

The structure of the neuron device based on a spin orbit torque according to this embodiment is shown in FIG. 1. This embodiment differs from the Embodiment 1 in the following.

In this embodiment, the antiferromagnetic coupling effect is taken as an example. The free layer 107 has an inclined magnetic anisotropy (in the x-z plane), and is composed of one or more materials selected from CoFeB, NiFe, Co, CoFeAl, and CoFe. This may be specifically achieved by annealing in an oblique magnetic field. The first ferromagnetic layer 110 has perpendicular magnetic anisotropy, and is composed of one or more materials selected from CoFeB, Co/Pt, CoFeAl, Co/Pd, and CoFe.

Specifically, the magnetization direction of the left pinning layer 102 is along a −z direction, and the magnetization direction of the right pinning layer 106 is along a +z direction, so that the magnetic domain wall may move within a range between the left and right pinning regions without being annihilated. The magnetization direction of the first ferromagnetic layer 110 is along the x direction, and the bottom antiferromagnetic pinning layer 111 is along the +z and x directions, so that the magnetization direction of the first ferromagnetic layer 110 may be pinned in the −z direction. The magnetization direction of the reference layer 104 is along the −z direction. The magnetization directions of the regions where the domain wall may move freely in the ferromagnetic free layer 107 are along the x and +z directions, so that the chirality of the domain wall in the free layer 107 remains unchanged, and a high velocity motion of the domain wall is achieved while avoiding uncertainty of a movement direction of a next integrate process caused by a precession induced chirality change of the domain wall during a leaky process.

Embodiment 4

Figure 2:
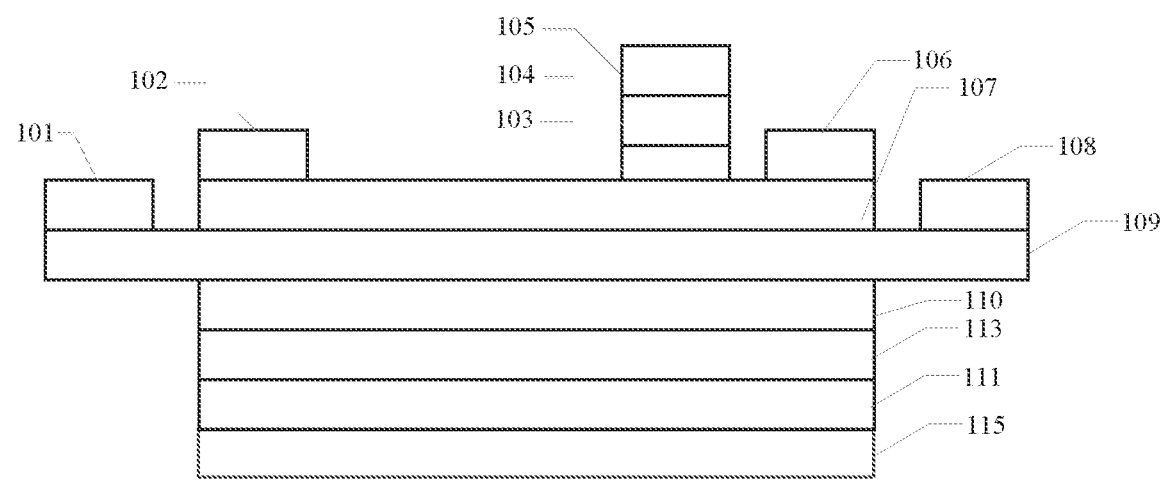
FIG. 2 illustratively shows a front view of a neuron device based on a spin orbit torque according to the fourth embodiment of the present disclosure.

FIG. 2 illustratively shows a front view of a neuron device based on a spin orbit torque according to the fourth embodiment of the present disclosure.

As shown in FIG. 2, the structure of the neuron device based on a spin orbit torque according to this embodiment differs from that in Embodiment 1 in the following.

In this embodiment, a second ferromagnetic layer 113 is formed between the antiferromagnetic pinning layer 111 and the first ferromagnetic layer 110, wherein the second ferromagnetic layer 113 has perpendicular magnetic anisotropy, and is composed of one or more materials selected from CoFeB, Co/Pt, CoFeAl, Co/Pd and CoFe. The first ferromagnetic layer 110 has an in-plane magnetic anisotropy, and is composed of one or more materials selected from Co, CoFeB, and NiFe.

In this embodiment, the magnetization direction of the left pinning layer 102 is along the −z direction, and the magnetization direction of the right pinning layer 106 is along the +z direction, so that the magnetic domain wall may move within a range between the left and right pinning regions without being annihilated. The magnetization direction of the first ferromagnetic layer 110 is along an x direction, and the bottom antiferromagnetic pinning layer 111 is along the +z direction, so that the magnetization direction of the second ferromagnetic layer 113 may be pinned in the −z direction. The magnetization direction of the reference layer 104 is along the −z direction. There is an exchange bias field at an interface between the first ferromagnetic layer 110 and the second ferromagnetic layer 113, so that the magnetization direction of the first ferromagnetic layer 110 is inclined (in the x-z plane). Under the RKKY action of a spacer layer, equivalent fields in the +z and x directions may be generated on the free layer 107, so that the chirality of the domain wall in the free layer 107 remains unchanged, and a high velocity motion of the domain wall is achieved while avoiding uncertainty of a movement direction of a next integrate process caused by a precession induced chirality change of the domain wall during a leaky process.

Embodiment 5

Figure 3:
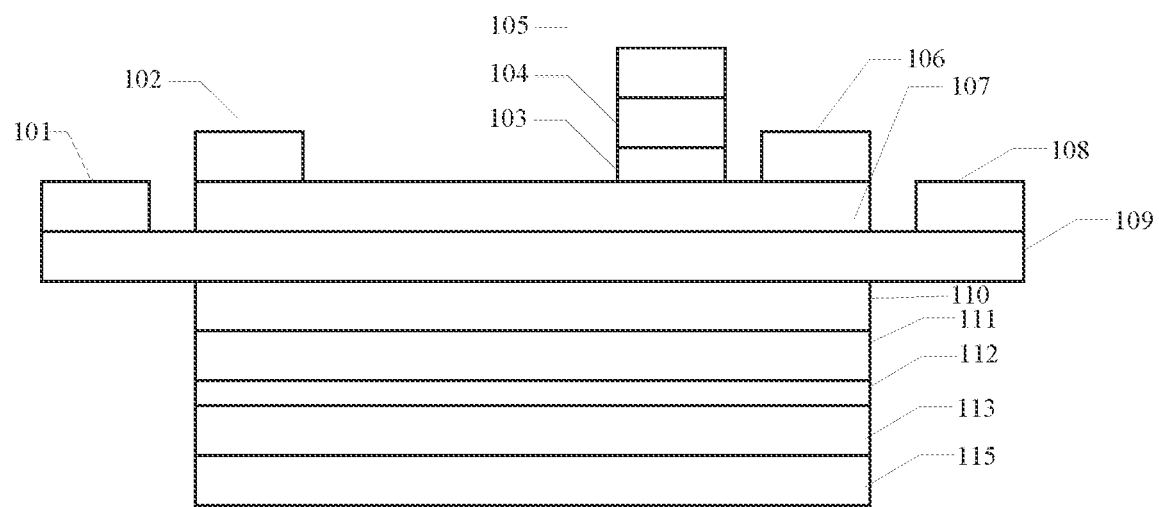
FIG. 3 illustratively shows a front view of a neuron device based on a spin orbit torque according to the fifth embodiment of the present disclosure.

FIG. 3 illustratively shows a front view of a neuron device based on a spin orbit torque according to the fifth embodiment of the present disclosure.

As shown in FIG. 3, the structure of the neuron device based on a spin orbit torque according to this embodiment differs from that in Embodiment 1 in the following.

A second ferromagnetic layer 113 and an insulating layer 112 are formed on the substrate in sequence, wherein the antiferromagnetic pinning layer 111 is located on the insulating layer 112. The first ferromagnetic layer 110 has perpendicular magnetic anisotropy, and is composed of one or more materials selected from CoFeB, Co/Pt, CoFeAl, Co/Pd and CoFe. The second ferromagnetic layer 113 has an in-plane magnetic anisotropy, and is composed of one or more materials selected from CoFeB, NiFe, and Co. The insulating layer 112 is made of an insulating material such as $SiO_2$.

In this embodiment, the magnetization direction of the left pinning layer 102 is along the −z direction, and the magnetization direction of the right pinning layer 106 is along the +z direction, so that the magnetic domain wall may move within a range between the left and right pinning regions without being annihilated. The bottom antiferromagnetic pinning layer 111 is along the +z direction, so that the magnetization direction of the first ferromagnetic layer 110 may be pinned in the −z direction. The magnetization direction of the reference layer 104 is along the −z direction. The magnetization direction of the second ferromagnetic layer 113 is along the x direction. The stray field generated by the second ferromagnetic layer 113 enables the chirality of the domain wall in the free layer 107 to remain unchanged, so that a high velocity motion of the domain wall is achieved while avoiding uncertainty of a movement direction of a next integrate process caused by a precession induced chirality change of the domain wall during a leaky process.

Embodiment 6

Figure 4:
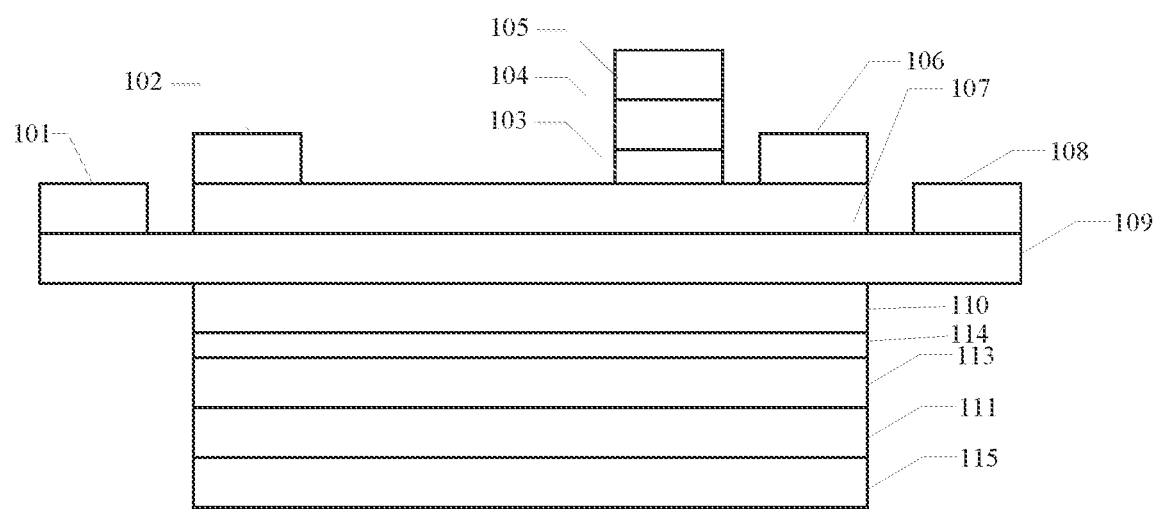
FIG. 4 illustratively shows a front view of a neuron device based on a spin orbit torque according to the sixth embodiment of the present disclosure.

FIG. 4 illustratively shows a front view of a neuron device based on a spin orbit torque according to the sixth embodiment of the present disclosure.

As shown in FIG. 4, the structure of the neuron device based on a spin orbit torque according to this embodiment differs from that in Embodiment 1 in the following.

The second ferromagnetic layer 113 and the spacer layer 114 are formed on the antiferromagnetic pinning layer 111 in sequence, wherein the first ferromagnetic layer 110 is located on the spacer layer 114. The spacer layer 114 is composed of one or more materials selected from Ru, Ta, W, V, Cr, Rh, Nd, Mo, and Re. The second ferromagnetic layer 113 has perpendicular magnetic anisotropy, and is composed of one or more materials selected from CoFeB, Co/Pt, CoFeAl, Co/Pd, and CoFe.

In this embodiment, the magnetization direction of the left pinning layer 102 is along the −z direction, and the magnetization direction of the right pinning layer 106 is along a +z direction, so that the magnetic domain wall may move within a range between the left and right pinning regions without being annihilated. The magnetization direction of the first ferromagnetic layer 110 is along an x direction, and the bottom antiferromagnetic pinning layer 111 is along the +z direction, so that the magnetization direction of the second ferromagnetic layer 113 may be pinned in the −z direction. The magnetization direction of the reference layer is along the −z direction. The first ferromagnetic layer 110 and the second ferromagnetic layer 113 are coupled by the RKKY exchange interaction of the spin orbit coupling layer 109, so that the magnetization direction of the first ferromagnetic layer 110 is inclined (in the x-z plane). Under the RKKY action of the spin orbit coupling layer 109, equivalent fields in the +z and x directions may be generated on the free layer 107, so that the chirality of the domain wall in the free layer 107 remains unchanged, and a high velocity motion of the domain wall is achieved while avoiding uncertainty of a movement direction of a next integrate process caused by a precession induced chirality change of the domain wall during a leaky process.

In Embodiments 1 to 6 provided according to the present disclosure, in an initial state, a z direction magnetization component of the region where the domain wall may move freely in the ferromagnetic free layer is along the +z direction, i.e., the magnetic domain wall is located near a boundary of the left pinning layer region. Therefore, when a current passes through between the left and right electrodes, the current flows through the spin orbit coupling layer, a spin current in the vertical direction is generated under the action of the spin Hall effect, and the generated spin orbit toque drives the domain wall to move along the +x direction, thereby simulating the integrate process of a neuron. When no current passes through, the first ferromagnetic layer will indirectly act on the ferromagnetic free layer through a synthetic antiferromagnetic coupling layer in the middle, so that its z direction magnetization component tends to the +z direction, even if the domain wall moves along the −x direction, the leaky process of a neurons is simulated. After a series of integrate and leaky processes, the domain wall moves to exceed a corresponding area of the ferromagnetic reference layer. At this time, the magnetization direction of the free layer is flipped from +z direction to −z direction, a tunneling magnetoresistance changes from a large anti-parallel state resistance to a small parallel state resistance, and may output a spike pulse in combination with an external circuit, thereby simulating the fire process of a neuron.

Figure 5:
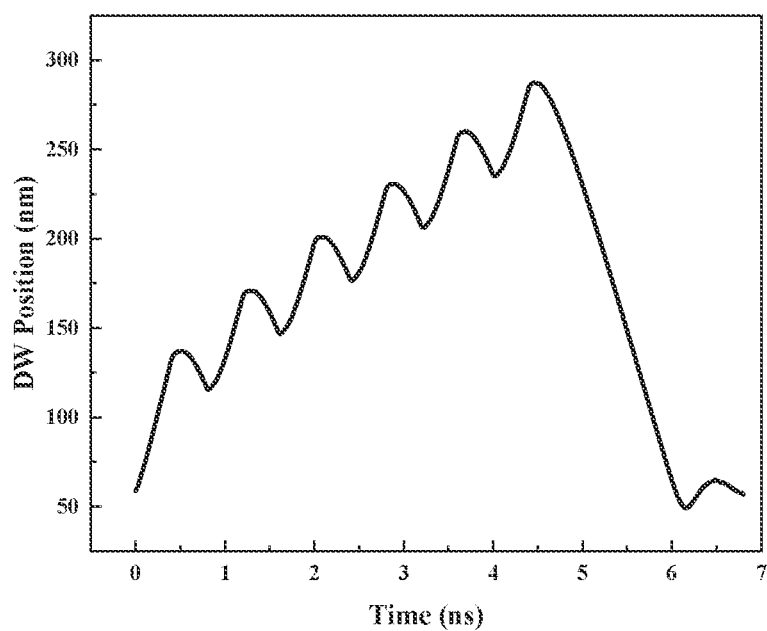
FIG. 5 illustratively shows a schematic characteristic diagram of leaky-integrate-fire of a neuron device based on a spin orbit torque according to an embodiment of the present disclosure.

FIG. 5 illustratively shows a schematic characteristic diagram of leaky-integrate-fire of a neuron device based on a spin orbit torque according to an embodiment of the present disclosure. The size of the free layer is 60×300 nm$^2$, and the size of the left or right pinning region is 60×30 nm$^2$. Six current pulses with an amplitude of 4×10$^7$ A/cm$^2$, a pulse width of 0.4 ns and a period of 0.8 ns are continuously applied to the device. During the period when the amplitude of the current pulse is 4×10$^7$ A/cm$^2$, the magnetic domain moves in the +x direction and the integrate continues. When the amplitude of the current pulse is 0, the magnetic domain wall moves along the −x direction under the RKKY exchange interaction to achieve the leaky process. After 6 consecutive pulses, the magnetic domain wall reaches the threshold region, and a neuron is activated. At this time, the output circuit will output a spike signal, and then, the neuron enters a withdrawal process. Also under the action of RKKY antiferromagnetic coupling, the magnetic domain wall moves along the −x direction to the initial position, thereby achieving a complete leaky-integrate-fire process of a biological neuron.

Figure 6:
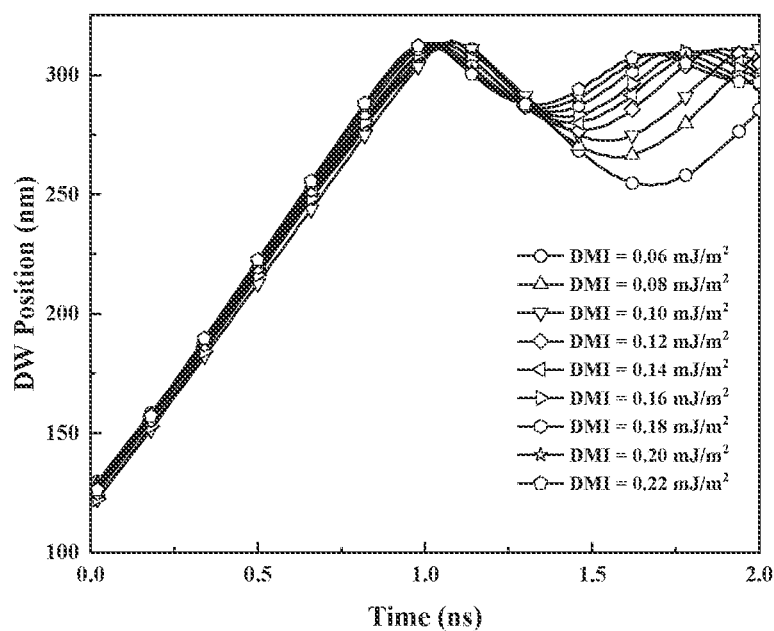
FIG. 6 illustratively shows a schematic diagram of an integrate characteristic and a Dzyaloshinskii-Moriya interaction of a neuron device based on a spin orbit torque according to an embodiment of the present disclosure.

FIG. 6 illustratively shows a schematic diagram of an integrate characteristic and a Dzyaloshinskii-Moriya interaction of a neuron device based on a spin orbit torque according to an embodiment of the present disclosure. It should be seen from FIG. 6 that with the enhancement of the Dzyaloshinskii-Moriya interaction (DMI), the velocity of the magnetic domain wall is accelerated, and therefore, the characteristics of the integrate process may be appropriately adjusted by adjusting the strength of the Dzyaloshinskii-Moriya interaction as required.

Figure 7:
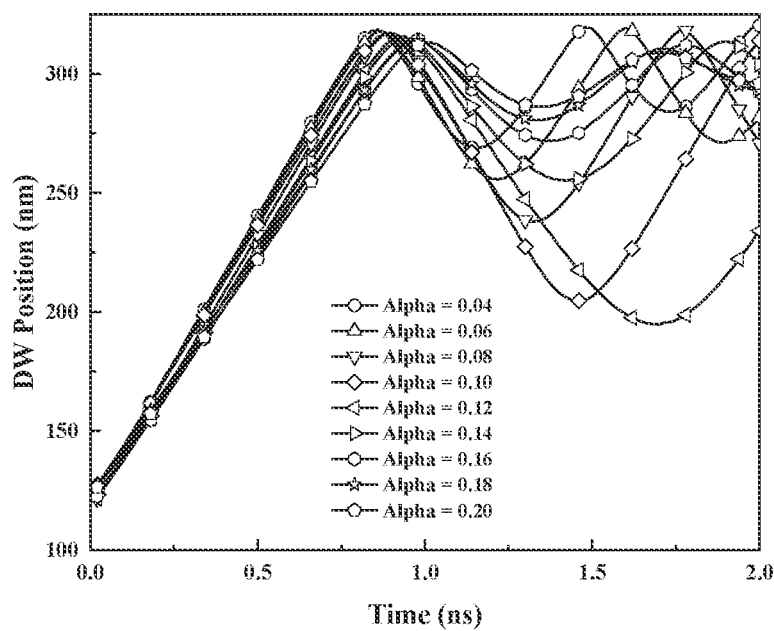
FIG. 7 illustratively shows a schematic diagram of a relationship between the integrate characteristic and a damping constant of a neuron device based on a spin orbit torque according to an embodiment of the present disclosure.

FIG. 7 illustratively shows a schematic diagram of a relationship between the integrate characteristic and a damping coefficient of a neuron device based on a spin orbit torque according to an embodiment of the present disclosure. It should be seen from FIG. 7 that as the damping coefficient increases, the velocity of the magnetic domain wall is slowed down, and therefore, the characteristics of the integrate process may be appropriately adjusted by adjusting the damping coefficient as required.

It should be noted that the length and width of each semiconductor material layer and the specific material examples in the above embodiments are only illustrative, and do not constitute limitations to the embodiments of the present disclosure.

Figure 8:
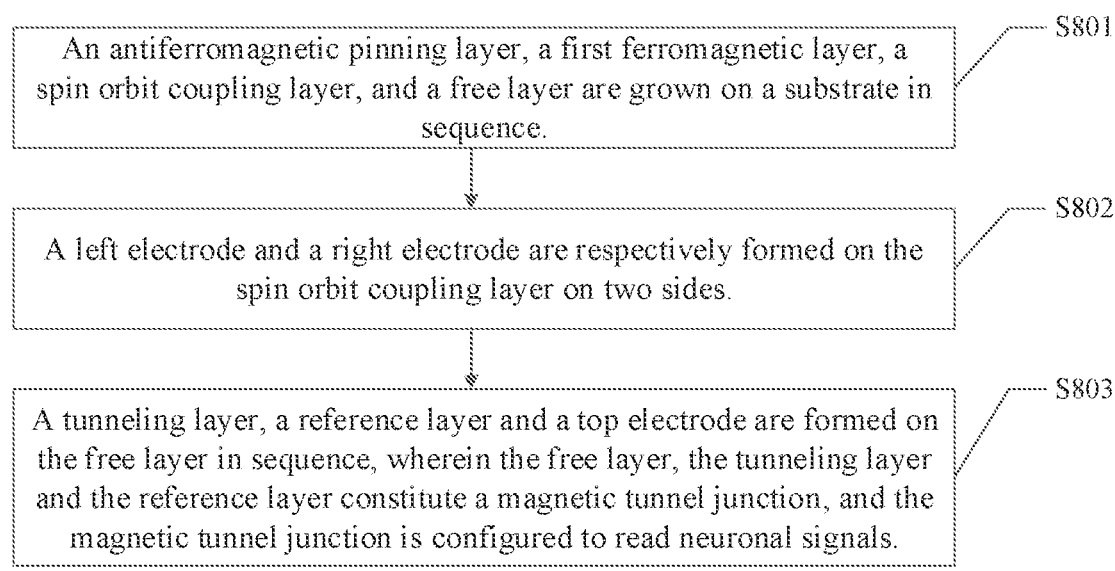
FIG. 8 illustratively shows a flow chart of a method for preparing a neuron device based on a spin orbit torque according to an embodiment of the present disclosure.

FIG. 8 illustratively shows a flow chart of a method for preparing a neuron device based on a spin orbit torque according to an embodiment of the present disclosure. The structure of the neuron device prepared by the method steps are shown in FIG. 1 to FIG. 4.

As shown in FIG. 8, the method for preparing a neuron device based on a spin orbit torque includes:

S801, an antiferromagnetic pinning layer, a first ferromagnetic layer, a spin orbit coupling layer, and a free layer are grown on a substrate in sequence.

S802, a left electrode and a right electrode are respectively formed on two sides of the spin orbit coupling layer.

S803, a tunneling layer, a reference layer and a top electrode are formed on the free layer in sequence, wherein the free layer, the tunneling layer and the reference layer form a magnetic tunnel junction, and the magnetic tunnel junction is configured to read neuronal signals.

It should be noted that in the embodiments of the present disclosure, the structure of the neuron device prepared by the above preparation process is shown in FIG. 1 to FIG. 4, and the specific material layers, layer thicknesses, and constitutional structures of the material layers are also shown in FIG. 1 to FIG. 4, which will not be described in detail here.

It should be noted that the process methods and materials used in the above steps in the embodiments of the present disclosure are only illustrative. For example, the above semiconductor layer may use a conventional thin film growth and etching method. Methods such as PVD, MBE, ALD, IBE, RIE and ICP may also be used to obtain a high quality epitaxial film, which is not limited in the present disclosure.

It may be seen from the above description that the above embodiments of the present disclosure achieve at least the following technical effects:

(1) The neuron device based on the magnetic tunnel junction may achieve an accumulation of current pulses from a synapse in a full electric field, and has a self-leaky function with both high energy efficiency and high reliability. When the accumulated current pulses drive a magnetic domain to move and exceed a threshold region, the neuron will be activated and emit a spike signal to simulate functions of a neuron in a human brain.

(2) A neuron device in which a magnetic domain wall is driven by a spin orbit torque is achieved.

(3) The chirality of the magnetic domain wall remains unchanged, and a high speed neuron device is achieved by modulating an inclined magnetization direction or an inclined magnetic anisotropy of the first ferromagnetic layer or the free layer.

The present disclosure has been illustrated and described in detail in the accompanying drawings and the preceding description, but such illustration and description should be considered illustrative or exemplary and not restrictive.

Those skilled in the art may understand that various ranges of combinations and/or incorporations of the features recited in various embodiments and/or in the claims of the present disclosure may be made, even if such combinations or incorporations are not expressly recited in the present disclosure. In particular, various combinations and/or incorporations of the features recited in various embodiments and/or in the claims of the present disclosure may be made without departing from the spirit and teachings of the present disclosure. All such combinations and/or incorporations fall within the scope of the present disclosure.

Although the present disclosure has been shown and described with reference to the specific exemplary embodiments of the present disclosure, those skilled in the art should understand that various modifications in form and detail may be made in the present disclosure without departing from the spirit and scope of the present disclosure as defined by the appended claims and their equivalents. Therefore, the scope of the present disclosure should not be limited to the above embodiments, but should be determined not only by the appended claims, but also by their equivalents.

What is claimed is:

1. A neuron device based on a spin orbit torque, the neuron device comprising:
    an antiferromagnetic pinning layer, a first ferromagnetic layer and a spin orbit coupling layer formed on a substrate in sequence;
        a free layer formed on the spin orbit coupling layer and moving a magnetic domain wall according to a spin orbit torque, the free layer having a first side facing toward the spin orbit coupling layer and a second side opposite to the first side;
        a tunneling layer formed on the free layer;
        a left pinning layer and a right pinning layer formed on the second side, and along one or more peripheral edges, of the free layer and having opposite magnetization directions; and
        a reference layer formed on the tunneling layer,
        wherein the free layer, the tunneling layer and the reference layer constitute a magnetic tunnel junction, and the magnetic tunnel junction is configured to read neuronal signals.

2. The neuron device based on a spin orbit torque according to claim 1, wherein:
    the free layer has a perpendicular magnetic anisotropy, and is composed of one or more materials selected from CoFeB, Co/Pt, CoFeAl, Co/Pd and CoFe;
    the first ferromagnetic layer has an in-plane magnetic anisotropy, and is composed of one or more materials selected from CoFeB, NiFe and Co; and
    the antiferromagnetic pinning layer has a perpendicular exchange interaction, and is composed of one or more materials selected from IrMn, FeMn, NiMn, CoMn, PtMn, $Mn_2Au$, NiO and MnO.

3. The neuron device based on a spin orbit torque according to claim 1, wherein:
    the free layer has a perpendicular magnetic anisotropy, and is composed of one or more materials selected from CoFeB, Co/Pt, CoFeAl, Co/Pd and CoFe;
    the first ferromagnetic layer has an inclined magnetic anisotropy, and is composed of one or more materials selected from CoFeB, NiFe, Co, CoFeAl and CoFe; and
    the antiferromagnetic pinning layer has a tilt exchange interaction, and is composed of one or more materials selected from IrMn, FeMn, NiMn, CoMn, PtMn, $Mn_2Au$, NiO and MnO.

4. The neuron device based on a spin orbit torque according to claim 1, wherein:
    the free layer has an inclined magnetic anisotropy, and is composed of one or more materials selected from CoFeB, NiFe, Co, CoFeAl and CoFe;
    the first ferromagnetic layer has a perpendicular magnetic anisotropy, and is composed of one or more materials selected from CoFeB, Co/Pt, CoFeAl, Co/Pd and CoFe; and
    the antiferromagnetic pinning layer has a perpendicular exchange interaction, and is composed of one or more materials selected from IrMn, FeMn, NiMn, CoMn, PtMn, $Mn_2Au$, NiO and MnO.

5. The neuron device based on a spin orbit torque according to claim 1, further comprising a second ferromagnetic layer formed between the antiferromagnetic pinning layer and the first ferromagnetic layer.

6. The neuron device based on a spin orbit torque according to claim 5, wherein:
    the free layer has a perpendicular magnetic anisotropy, and is composed of one or more materials selected from CoFeB, Co/Pt, CoFeAl, Co/Pd and CoFe;
    the first ferromagnetic layer has an in-plane magnetic anisotropy, and is composed of one or more materials selected from CoFeB, NiFe and Co;
    the antiferromagnetic pinning layer has a perpendicular exchange interaction, and is composed of one or more materials selected from IrMn, FeMn, NiMn, CoMn, PtMn, $Mn_2Au$, NiO and MnO; and
    the second ferromagnetic layer has a perpendicular magnetic anisotropy, and is composed of one or more materials selected from CoFeB, Co/Pt, CoFeAl, Co/Pd and CoFe.

7. The neuron device based on a spin orbit torque according to claim 1, further comprising a second ferromagnetic layer and an insulating layer formed on the substrate in sequence, wherein the antiferromagnetic pinning layer is located on the insulating layer.

8. The neuron device based on a spin orbit torque according to claim 7, wherein:
    the free layer has a perpendicular magnetic anisotropy, and is composed of one or more materials selected from CoFeB, Co/Pt, CoFeAl, Co/Pd and CoFe;
    the first ferromagnetic layer has a perpendicular magnetic anisotropy and is composed of one or more materials selected from CoFeB, Co/Pt, CoFeAl, Co/Pd and CoFe;
    the antiferromagnetic pinning layer has a perpendicular exchange interaction, and is composed of one or more materials selected from IrMn, FeMn, NiMn, CoMn, PtMn, $Mn_2Au$, NiO and MnO;
    the insulating layer is composed of $SiO_2$; and
    the second ferromagnetic layer has an in-plane magnetic anisotropy, and is composed of one or more materials selected from CoFeB, NiFe, and Co.

9. The neuron device based on a spin orbit torque according to claim 1, further comprising a second ferromagnetic layer and a spacer layer formed on the antiferromagnetic pinning layer in sequence, wherein the first ferromagnetic layer is located on the spacer layer.

10. The neuron device based on a spin orbit torque according to claim 9, wherein:
    the free layer has a perpendicular magnetic anisotropy, and is composed of one or more materials selected from CoFeB, Co/Pt, CoFeAl, Co/Pd and CoFe;
    the first ferromagnetic layer has an in-plane magnetic anisotropy, and is composed of one or more materials selected from CoFeB, NiFe and Co;
    the spacer layer is composed of one or more materials selected from Ru, Ta, W, V, Cr, Rh, Nd, Mo, and Re;

the second ferromagnetic layer has a perpendicular magnetic anisotropy, and is composed of one or more materials selected from CoFeB, Co/Pt, CoFeAl, Co/Pd, and CoFe; and the antiferromagnetic pinning layer has a perpendicular exchange interaction, and is composed of one or more materials selected from IrMn, FeMn, NiMn, CoMn, PtMn, $Mn_2Au$, NiO and MnO.

\* \* \* \* \*